UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

METHYLKETOBUTANOL.

981,668.  Specification of Letters Patent.  Patented Jan. 17, 1911.

No Drawing.   Application filed December 21, 1909.  Serial No. 534,348. (Specimens.)

*To all whom it may concern:*

Be it known that we, GEORG MERLING, professor of chemistry, doctor of philosophy, and HUGO KÖHLER, doctor of philosophy, citizens of the German Empire, residing at Elberfeld, Germany, have invented new and useful Improvements in Methylketobutanol, of which the following is a specification.

This application relates to the manufacture and production of methylketobutanol while in our copending application Serial No. 533699, filed December 17, 1909, we describe the whole class of ketone alcohols. The new product is obtained by treating ethylmethylketone with formaldehyde or compounds capable of generating formaldehyde in the presence of alkaline condensing agents exercising a mild action on the components to be condensed. Such condensing agents are *e. g.* sodium or potassium carbonate, magnesium carbonate or oxid, bisodium phosphate, borax, etc.

In order to illustrate the new process more fully the following example is given, the parts being by weight: A mixture of 100 parts of ethylmethylketone with 30 parts of a 35 per cent. formaldehyde is mixed together with an aqueous solution of 1 part of potassium carbonate in 2 parts of water. The mixture is allowed to stand for about 40 hours while shaking it from time to time until in a test portion diluted with water formaldehyde can no longer be detected. To carry out this test some drops of an aqueous solution of acetate of anilin are added to the diluted liquid which is then allowed to stand for 15 minutes. If after this time no precipitation or clouding due to the formation of methylene anilin is observed, the liquid is free from formaldehyde. The potash solution is removed by means of a separatory funnel, the remaining liquid is carefully neutralized with dilute hydrochloric acid or it is acidulated with tartaric acid, the potassium chlorid or tartrate is filtered off and the filtrate is distilled *in vacuo*, the vessel being heated on a water bath. Methylethylketone passes over, while the new methylketobutanol:

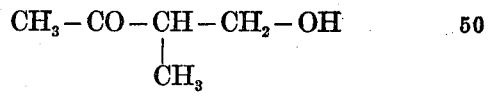

remains as a thick oil. The crude product boils at from 80 to 110° C. at 16 mm. pressure. The pure methylketobutanol boils at 90 to 91° C. at 18 mm. pressure. It is a limpid colorless oil soluble in water, alcohol and ether. On being boiled with acetic acid anhydrid it is converted into the acetyl compound

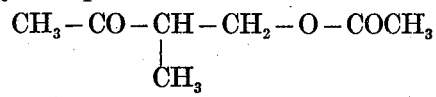

a limpid, stable oil boiling at 90 to 92° C. at 16 mm. pressure. The formation of the new product takes probably place according to the following formula:

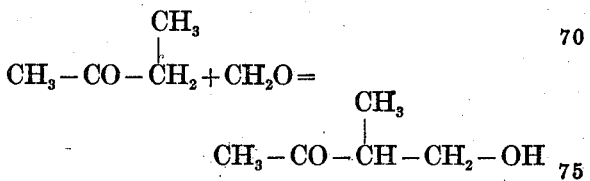

The methylketobutanol is a valuable intermediate product for the production of pharmaceutical products or other valuable bodies.

We claim:

The herein described methylketobutanol, obtainable by reacting upon methylethylketone with formaldehyde, which is a limpid colorless oil boiling at 90–91° C. at 18 mm. pressure, soluble in water, alcohol, ether and benzole, being converted into the acetyl compound on being boiled with acetic acid anhydrid, which acetyl compound is a limpid oil boiling at 90–92° C. at 16 mm. pressure, substantially as described.

In testimony whereof we have hereunto set our hands in the presence of two subscribing witnesses.

GEORG MERLING. [L. S.]
HUGO KÖHLER. [L. S.]

Witnesses:
  OTTO KÖNIG,
  CHAS. J. WRIGHT.